Dec. 30, 1969  J. S. GWINN ET AL  3,486,193
APPARATUS FOR EXTRUDING THERMOPLASTIC MATERIAL
Filed May 22, 1967
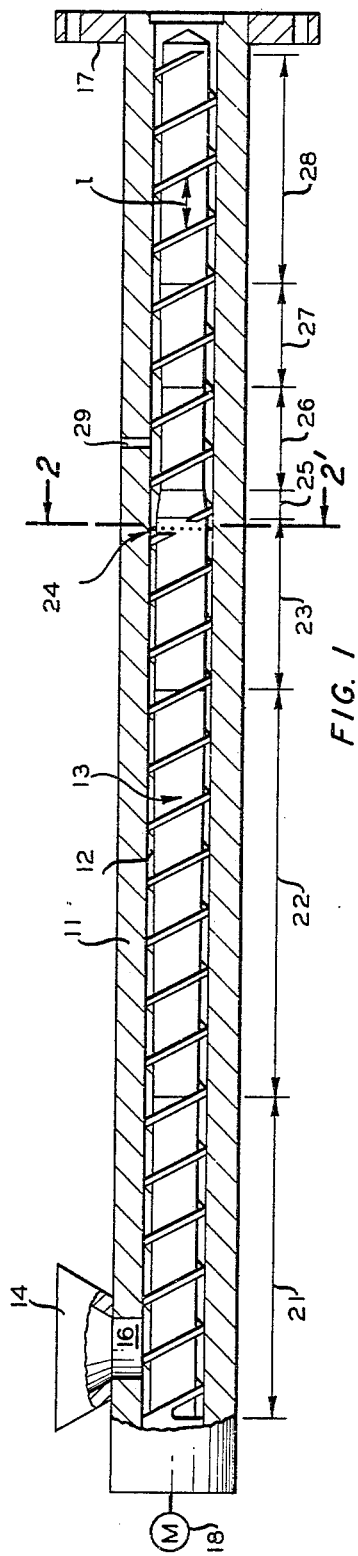
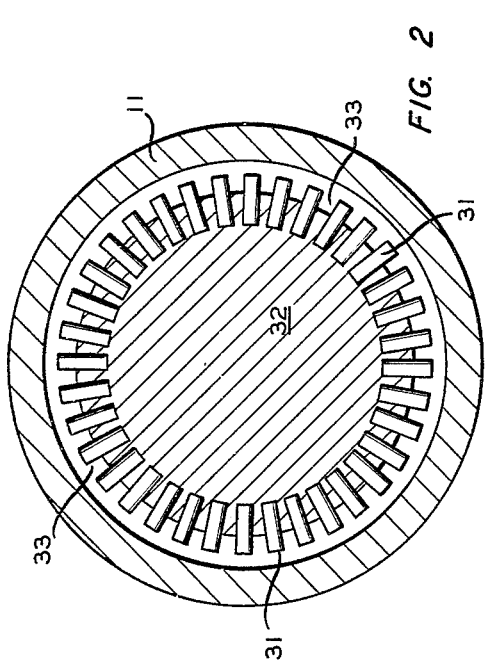
INVENTORS
J. S. GWINN
D. C. CHRISTENSEN
BY
*Young & Quigg*
ATTORNEYS

United States Patent Office 3,486,193
Patented Dec. 30, 1969

3,486,193
APPARATUS FOR EXTRUDING THERMOPLASTIC MATERIAL
J. S. Gwinn and Don C. Christensen, Bartlesville, Okla., assignors to Phillips Petroleum Company, a corporation of Delaware
Filed May 22, 1967, Ser. No. 640,153
Int. Cl. B29f 3/02
U.S. Cl. 18—12          8 Claims

ABSTRACT OF THE DISCLOSURE

An extruder wherein a constant diameter extruder bore is provided with a screw having in the following order a feed section, a compression section, a metering section, a melt mixing ring, a decompression section, a second compression section, and a second metering section. The melt mixing ring, a plurality of pins extending radially from the screw root into the annular clearance between the root and the flight diameter, provides for bulk mixing of the molten thermoplastic material in the extruder.

---

This invention relates to extruding thermoplastic materials. In one aspect the invention relates to a novel extruder screw. In another aspect the invention relates to an improved, lower temperature extrusion method.

Thermoplastic extrusion consists generally of feeding a thermoplastic polymer or resin, which is usually in dry particulate form, through a cylinder wherein the material is softened to a molten mass, and then forcing the mass through a die as an extrudate of desired shape. The cylinder is provided with a feed hopper at one end and a die at the other end. A screw, mounted for rotation in the cylinder, receives the particulate thermoplastic material from the hopper and forces the material along the cylinder bore and through the die. Heat supplied through the cylinder and generated by the working of the screw causes the material to become molten (fluxed) and flow through the die as an extrudate having the desired cross sectional shape.

The action of the screw, in addition to carrying the material through the bore, effects a physical blending of the particles and a shearing type of mixing between the fluxed material and the particles at the cylinder bore walls and screw flight edges. Thorough mixing and blending of the material is necessary to provide a homogeneous melt and to obtain the uniform extrudate. In some conventional extruders it is necessary to operate at elevated temperatures to ensure a homogeneous melt which does not contain lumped dry particulate material. At these elevated temperatures many polymers exhibit melt index decrease with a corresponding molecular weight increase; a characteristic which causes difficulties for the fabricator or processor using the polymer. For example, some polymeric materials are practically unsuitable for certain types of manufacture because of a melt index decrease in the extrusion process which tends to produce an extrudate of very poor quality. The surface appearance is often adversely effected. Thus, it is highly desirable to extrude a polymer without changing the melt index.

By the practice of the invention, wherein a novel screw and extrusion apparatus is provided, it is possible to process polymers at high throughput rates and at lower temperatures than is possible with a conventional screw extruder. The high temperatures necessary to ensure a homogeneous melt and the resulting melt index decrease are eliminated by providing a melt dispersing device which gives a uniform melt and high quality extrudate.

Accordingly it is an object of the invention to provide an improved screw extrusion apparatus.

Another object of the invention is to produce a homogeneous melt of uniform quality in an extrusion process.

Another object of the invention is to provide a method of extruding thermoplastic polymers without changing the melt index thereof.

These and other objects will be apparent to one skilled in the art upon consideration of the following specification, drawings, and appended claims.

FIGURE 1 is a longitudinal cross section of the extrusion apparatus of the invention.

FIGURE 2 is a transverse cross sectional view of the apparatus taken along line 2–2′.

As used in this application, flight diameter refers to a value twice the distance from the center of the screw to a point on the edge of a screw flight in a plane perpendicular to the axis of the screw. The root diameter of the screw is the diameter of the shaft or shank about which the screw flight is helically positioned. The flight diameter is constant so as to maintain a constant clearance in the cylindrical bore, with the flight depth or root diameter being varied to provide different degrees or blending and shearing in the extruder.

According to the invention, there is provided an extrusion screw comprising in the following order from the feed end, a constant root diameter feed section; a first constantly increasing root diameter compression section; a first constant root diameter metering section; melt dispersing means positioned in the root of the screw within at least one screw flight upstream of the discharge end of the metering section and extending outwardly into the annular space between the screw root and the flight diameter to form alternating open and closed portions in this annular space; a decompression section of a constant root diameter which is less than the root diameter of the first metering section; a second constantly increasing root diameter compression section; and a second constant root diameter metering section.

Further in accordance with the invention there is provided an extrusion apparatus comprising an extruder housing having a longitudinally extending constant diameter cylindrical bore with a feed end and a discharge end and the above-described screw rotatably mounted in the bore. The extrusion apparatus is provided with driving means to rotate the screw and means to feed thermoplastic material to the screw.

In one embodiment of the invention, the dispersing means is positioned one-half screw flight upstream of the discharge end of the first metering section of the screw and comprises a plurality of cylindrical pins positioned circumferential distance apart about the screw root and extending, in a plane perpendicular to the screw axis, out to the flight diameter of the screw. In another embodiment of the invention, the dispersing means, a plurality of spaced apart square pegs extending radially from the root of the screw, are positioned a full flight length before the discharge end of the first metering means and extend to within about .015 inch of the flight diameter.

With respect to the configuration of the screw of the invention, the constant root diameter feed section has a length in the range of 3 to 12 flight diameters, preferably in the range of 4 to 8 flight diameters. The first constantly increasing root diameter compression section has a length in the range of 2 to 9 flight diameters, preferably in the range of 5 to 9 flight diameters. The first constant root diameter metering section has a length in the range of 2 to 6 flight diameters, preferably in the range of 2 to 4 flight diameters. The constant root diameter decompression section has a length in the range of 1 to 3 flight diameters, preferably about 2 flight diameters. If desired, a transition zone may be interposed between the first metering section and the decompression section to effect the reduction in root diameter or the reduction in diameter may be effected by a simple stepdown shoulder without using such a transition zone. The second constantly increasing root diameter compression section has a length in the range of 1 to 3 flight diameters, preferably in the range of 2 to 3 flight diameters. The second constant root diameter metering section has a length in the range of 3 to 6 flight diameters, preferably in the range of 3 to 5 flight diameters. These wide ranges define operable limits for a variety of extruder power and different thermoplastic materials. It should be understood that the inventive concept does not lie in any particular length or any certain section but rather in the combination of the described screw configuration including the melt dispersion means in the first metering zone.

The melt mixing means in combination with the described screw acts to ensure the homogeneous polymer melt is obtained in the extruder. By the time that the powdery or fluff polymer, which is fed to the apparatus, has advanced through the first portion of the first metering section, it is substantially molten, but contains some unfluxed particulate material. The melt mixing ring breaks up the flow pattern of the semi-molten material and imparts a bulk mixing action which is further enhanced in the decompression section. The melt dispersion means does, of course, restrict flow and to avoid an excessive back pressure in the extruder, the portion of the annular space between the root and flight diameter should not be restricted more than about 60 percent. A restriction of at least 20 percent of this annular space is necessary to ensure that the desired bulk mixing is obtained.

Referring now to the drawings, wherein like reference numerals denote like elements in the different figures, FIGURE 1 illustrates an extruder housing or barrel 11 enclosing a cylindrical bore 12 which contains a screw 13. Feed hopper 14 supplies material to be extruded through inlet port 16 to bore 12. Flange 17 at the outlet end of bore 12 provides for the attachment of adapters, dies and the like auxiliary equipment. A suitable motor and gearing mechanism 18 (shown schematically) rotates the screw in the direction to advance material to the right as viewed in FIGURE 1.

The screw comprises a constant root diameter feed section 21, a constantly increasing root diameter compression section 22, a constant root diameter metering section 23 with a dispersing or mixing ring 24, a constantly decreasing root diameter transition section 25, a constant root diameter decompression section 26, a constantly increasing root diameter compression section 27, and a constant root diameter metering section 28. A vent pasageway 29 communicating with bore 12 in the decompression section 26 is provided to allow for the removal of volatiles when extruding certain types of thermoplastics. The pitch of the screw, L, is substantially equal to the flight diameter.

As shown in FIGURE 2, the melt mixing ring 24 comprises a plurality of cylindrical pins 31 positioned in holes drilled into the shank or root 32 of screw 13. The pins 31 are shown as symmetrically arranged about the circumference of the root and extend outwardly to a distance coinciding with the screw flight diameter. The screw flight which would show behind the melt mixing ring has been omitted from FIGURE 2 for the sake of clarity. The pins define a restriction of 50 percent in the annular space between the root diameter and the flight diameter. The 50 percent of this space remaining open to flow is divided into a plurality of flow channels 33 which receive the material as it flows along the screw flight and effectively mixes it before it is picked up and carried forward by the next screw flight.

The illustrated embodiment is especially effective in providing melt mixing in the extrusion of high molecular weight polyethylene at a relatively low temperature. Different numbers of pins and unequal spacing arrangements can be used depending upon the characteristics of the particular melt and the extrusion conditions.

In operation of the illustrated apparatus, dry particulate thermoplastic material, for example in powder form, is fed through hopper 14 and port 16 to screw 13. As the screw rotates, feed section 21 carries the material forward to compression section 22, where because of the constantly increasing root diameter, the material is subjected to a shearing type of mixing and the pressure is increased. As the semi-molten material is advanced into metering section 23 it is further sheared, heated, and blended. Mixing ring 24 in section 23 further blends the material, dispersing dry material uniformly through the semi-molten melt. In decompression section 26 the pressure is reduced and the material is further heated and melted. Any volatiles present are removed via vent 29. As the material is carried through compression section 27, pressure is again increased and the material is further subjected to shearing action between the flight surfaces and bore wall. In metering section 28 pressure is increased, decreased, or maintained constant and the melt is mixed while awaiting discharge through a die or like equipment.

The following example will serve to further illustrate the invention.

EXAMPLE

In an extruder, as illustrated in FIGURES 1 and 2, feed section 21 was 22½ inches long and had a root diameter of 3.652 inches. The first compression section 22 was 27½ inches long with a root diameter at the feed end of 3.652 inches and at the discharge end of 4.112 inches. The first metering section 23 was 17½ inches long with a root diameter of 4.052 inches. At a point 2¼ inches upstream of the discharge of the first metering section a 1¼ inch wide section of the screw flight was removed and the melt mixing means was attached. Thirty-six ³⁄₁₆-inch diameter pins on 10° centers were fitted into holes drilled into the root of the screw. Each pin extended 0.22 inch outwardly from the root which had a diameter of 4.052 inches. The transition section 25 had a length of 2¼ inches and a root diameter decreasing from 4.052 inches to 3.652 inches. The decompression section 26 had a length of 9 inches and a root diameter of 4.062 inches. The second compression section 27 had a length of 8 inches with the root diameter increasing constantly from 3.652 inches to 4.062 inches. The second metering section 28 was 19 inches long with a root diameter of 3.992 inches. The flight diameter of the screw was between 4.492 and 4.493 inches and the cylinder bore had an inside diameter of 4.500 inches. The screw was machined to within about 0.005 inch of the above-mentioned dimensions.

A homopolymer of ethylene having a density of 0.96 was used in a test of the extrusion apparatus. The melt index of the polymer after fluxing in a drum dryer at 324° F. (80 p.s.i. steam) was determined to be 0.17. The polymer was extruded in strands under the conditions shown in Table I and a melt index of the extrudate was determined. All melt indices were determined by ASTM method D–1238–57T using condition F with melt index being determined at 190° C.

TABLE I

| Run No. | Screw speed, r.p.m. | Extrudate temperature, ° F. | Rate, lbs./hr. | Product melt index |
|---|---|---|---|---|
| 1 | 100 | 460 | 810 | 0.16 |
| 2 | 100 | 460 | 850 | 0.18 |
| 3 | 120 | | 950 | 0.17 |

The extrudate was uniform and of good quality, indicating that a homogeneous melt was obtained in the extruder. The extruded strands were pelletized. The pellets were processed into sheet material, which was thermoformed. The thermoformed material was evaluated and determined to be of high quality with good surface properties.

For purposes of comparison, extrusion runs were made with a screw of the same configuration and dimensions which was not equipped with the melt mixing means. The melt index of the ethylene homopolymer (0.96 density was 0.16. The extrusion conditions and melt index of the extrudate are given in the table below:

TABLE II

| Run No. | Screw speed, r.p.m. | Extrudate temperature, °F. | Rate, lbs./hr. | Product melt index |
|---|---|---|---|---|
| 4 | 100 | 460 | 840 | 0.13 |
| 5 | 59 | 510 | 675 | 0.11 |

The conditions shown in Table II gave a product of poorer but acceptable quality and there was a significant decrease in the melt index of the extruded polymer.

A comparison of the results given in the two tables shows that the combination of the two-stage screw and melt mixing means produces high polymer throughput rates at lower temperatures without any significant change in melt index. Using the same screw without the mixing ring calls for operation at average higher temperatures and average lower throughput rates to obtain a homogeneous polymer melt; and results in a decrease in melt index.

In another test, an 8-inch diameter scale-up of the 4½-inch diameter screw described above was equipped with the same type of mixing ring except that every third pin was omitted, thus providing different sized open flow channels in the mixing means. This extruder was operated at 1800 lbs./hr. with an average extrudate temperature of 460° F. to produce a uniform extrudate which had the same melt index as the ethylene homopolymer fed to the apparatus.

Reasonable modification and variation are within the scope of the invention which sets forth a novel method of lower temperature extrusion and a novel screw extrusion apparatus.

That which is claimed is:

1. A screw for extruding thermoplastic material comprising in the order named from the feed end of said screw:
   a constant root diameter feed section;
   a first constantly increasing root diameter compression section;
   a first constant root diameter metering section; and
   melt dispersing means comprising a plurality of cylindrical metal pins extending radially from the root of said screw.

2. The apparatus of claim 1 including, in the order named downstream from said melt dispersing means:
   a decompression section of constant root diameter less than the root diameter of said metering section;
   a second constantly increasing root diameter compression section; and
   a second constant root diameter metering section.

3. The apparatus of claim 2 including a constantly decreasing root diameter transition section between said first metering section and said decompression section.

4. The apparatus of claim 2 wherein:
   said feed section has a length in the range of 3 to 12 flight diameters;
   said first compression section has a length in the range of 2 to 9 flight diameters;
   said first metering section has a length in the range of 2 to 6 flight diameters;
   said decompression section has a length in the range of 1 to 3 flight diameters;
   said second compression section has a length in the range of 1 to 3 flight diameters; and
   said second metering section has a length in the range of 3 to 6 flight diameters.

5. The apparatus of claim 2 wherein:
   said feed section has a length in the range of 4 to 8 flight diameters;
   said first compression section has a length in the range of 5 to 9 flight diameters;
   said first metering section has a length in the range of 2 to 4 flight diameters;
   said decompression section has a length in the range of about 2 flight diameters;
   said second compression section has a length in the range of 2 to 3 flight diameters; and
   said second metering section has a length in the range of 3 to 5 flight diameters.

6. The apparatus of claim 2 wherein said closed portion in the annular space between said root diameter and said flight diameter in the melt dispersion means comprises 20 to 60 percent of said annular space.

7. The apparatus of claim 1 including:
   an extruder housing having a longitudinally extending, constant diameter cylindrical bore therein, said screw being rotatably mounted in said bore;
   driving means to rotate said screw; and
   means for feeding said material to said screw.

8. The apparatus of claim 7 wherein said extruder housing has a vent passageway providing communication between the decompression section and the outside of said extruder housing to allow removal of volatiles from said material.

References Cited

UNITED STATES PATENTS

| 2,705,343 | 4/1955 | Hendry. |
| 2,817,876 | 12/1957 | Gandelli et al. |
| 3,023,456 | 3/1962 | Palfey. |
| 3,150,214 | 9/1964 | Scalora et al. |
| 3,199,147 | 8/1965 | Aykanian et al. |
| 3,239,883 | 3/1966 | Ferran. |
| 3,248,469 | 4/1966 | Kosensky et al. |
| 3,287,477 | 11/1966 | Vesilind. |
| 3,300,810 | 1/1967 | Gregory et al. |

WILLIAM J. STEPHENSON, Primary Examiner

UNITED STATES PATENT OFFICE

CERTIFICATE OF CORRECTION

Patent No. 3,486,193     Dated: December 30, 196

J. S. Gwinn et al

It is certified that error appears in the above-identified patent and that Letters Patent are hereby corrected as shown below:

Column 6, line 29, delete "2" and insert --- 1 ---.

SIGNED AND
SEALED

JUN 30 1970

(SEAL)
Attest:

Edward M. Fletcher, Jr.
Attesting Officer

WILLIAM E. SCHUYLER, JR.
Commissioner of Patents